(12) United States Patent
Kimura

(10) Patent No.: US 10,899,294 B2
(45) Date of Patent: Jan. 26, 2021

(54) GROMMET ASSEMBLY

(71) Applicant: YAZAKI CORPORATION, Tokyo (JP)

(72) Inventor: Akitoshi Kimura, Toyota (JP)

(73) Assignee: YAZAKI CORPORATION, Tokyo (JP)

(*) Notice: Subject to any disclaimer, the term of this patent is extended or adjusted under 35 U.S.C. 154(b) by 41 days.

(21) Appl. No.: 16/535,820

(22) Filed: Aug. 8, 2019

(65) Prior Publication Data

US 2020/0070752 A1 Mar. 5, 2020

(30) Foreign Application Priority Data

Aug. 30, 2018 (JP) .................................. 2018-161971

(51) Int. Cl.
*B60R 16/02* (2006.01)
*H01R 13/52* (2006.01)

(52) U.S. Cl.
CPC ..... *B60R 16/0222* (2013.01); *H01R 13/5202* (2013.01); *H01R 2201/26* (2013.01)

(58) Field of Classification Search
CPC ........................... H01R 13/5202; H01R 13/52; B60R 16/0215; B60R 16/0207; H02G 3/22; H02G 3/04
See application file for complete search history.

(56) References Cited

U.S. PATENT DOCUMENTS

| 5,252,089 | A | * | 10/1993 | Hatagishi | ................ | B60R 16/02 439/310 |
| 5,300,734 | A | * | 4/1994 | Suzuki | ................... | H01R 13/56 174/135 |
| 8,651,460 | B2 | * | 2/2014 | Callahan | ................ | H02G 1/085 254/134.3 R |
| 2015/0318679 | A1 | * | 11/2015 | Nakai | ................ | H01R 13/5219 16/2.2 |
| 2015/0364856 | A1 | * | 12/2015 | Nakai | ................. | B60R 16/0222 439/587 |
| 2017/0201038 | A1 | * | 7/2017 | Watai | ................. | H01R 13/5202 |
| 2018/0222406 | A1 | * | 8/2018 | Baydoun | ............ | B60R 16/0222 |

FOREIGN PATENT DOCUMENTS

| JP | 6-15274 U | 2/1994 |
| JP | 2007-189839 A | 7/2007 |
| JP | 2017-123288 A | 7/2017 |

* cited by examiner

*Primary Examiner* — Timothy J Thompson
*Assistant Examiner* — Amol H Patel
(74) *Attorney, Agent, or Firm* — Sughrue Mion, PLLC

(57) ABSTRACT

A grommet assembly includes an inner member having a first half portion and a second half portion, each having a body portion to be fitted into a mounting hole of a panel, a panel engagement portion configured to be engaged with an opening edge of the mounting hole, a grommet to be mounted to a rear side of the inner member and a first protruding part protruding from a rear side of the first half portion toward a rear wall of the wire housing portion. The inner member is to be dividable into the first and second half portions along a fitting direction of the body portion to the mounting hole. The first protruding part includes a first hook portion bent back at a protruding end of the first protruding part and includes a first pressing support portion including the protruding end of the first protruding part.

4 Claims, 15 Drawing Sheets

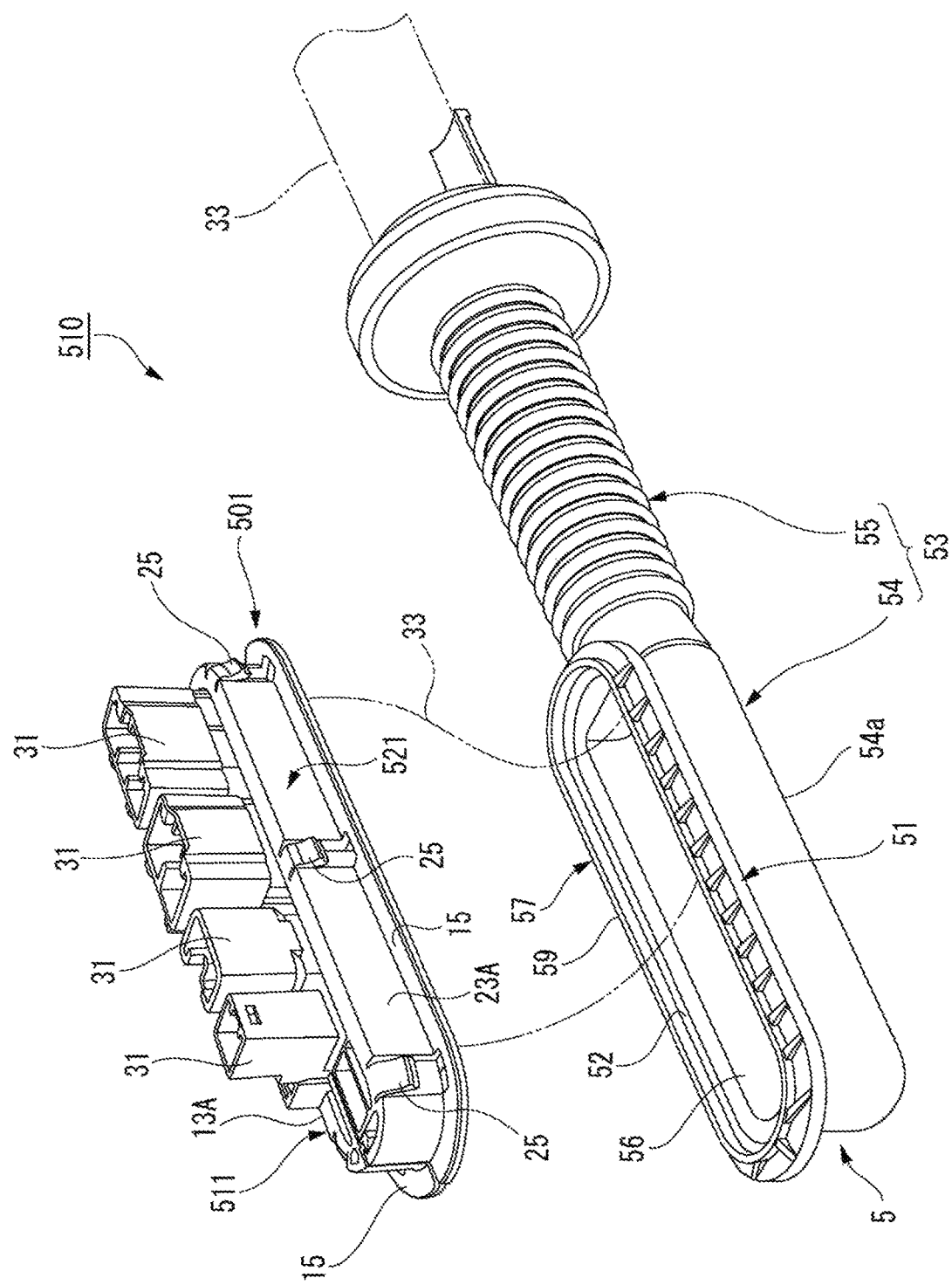

GROMMET ASSEMBLY

CROSS-REFERENCE TO RELATED APPLICATION

The present application claims priority to Japanese Patent Application No. 2018-161971 filed on Aug. 30, 2018, the entire content of which is incorporated herein by reference.

TECHNICAL FIELD

The present invention relates to a grommet assembly.

BACKGROUND ART

A electric wire bundle (electric wires) routed between a vehicle body and a door in a vehicle such as an automobile is passed through a flexible grommet, so as to be protected and to ensure waterproof property (see, JPH06-15274U, JP2007-189839A, and JP2017-123288A).

A related art grommet assembly includes a connector (an example of an inner member) and a grommet attached to a rear portion of the connector (see, e.g., JPH06-15274U). The connector includes a panel engagement portion configured to be engaged with an opening edge of a mounting hole formed in a panel of a vehicle and an annular flange portion configured to face a portion of the panel surrounding the mounting hole. The panel engagement portion and the annular flange portion are respectively formed on the outside of the connector. The grommet includes a tubular wire housing portion covering the electric wire bundle, and a panel contact portion fitted so as to cover the flange portion and be in contact with the portion of the panel surrounding the mounting hole. The grommet assembly is attached to the panel of the vehicle in a state where a seal part of the panel contact portion is in tight contact with a surface of the portion of the panel surrounding the mounting hole by locking the panel engagement portion of the connector to the opening edge of the mounting hole.

Depending on the shape of the panel at a mounting position of the vehicle, a mounting space may be narrow and there is not a space for an operator's hand to get in around the grommet assembly. When attaching the grommet assembly to the panel, in order to lock the panel engagement portion to the opening edge of the mounting hole, it is necessary to press the panel contact portion of the grommet, which is a press surface, with a finger, but if there is no space around the grommet assembly, the panel contact portion cannot be pressed with a finger, and it may be difficult to mount the grommet. Since the grommet is made of an elastic material such as rubber, the grommet will be elastically deformed even if a ceiling of the wire housing portion is pressed. Therefore, even if the ceiling of the wire housing portion is pressed, the pressing force may not be sufficiently transmitted to the panel contact portion, in which case the panel engagement portion of the connector cannot be properly locked to the opening edge of the mounting hole.

If the panel engagement portion of the connector is not properly locked to the opening edge of the mounting hole, the seal part of the panel contact portion of the grommet may not be in tight contact with the surface of the panel, and the seal property may be degraded. The grommet assembly, in which the panel engagement portion of the connector is not properly locked to the opening edge of the mounting hole, may come off from the mounting hole of the panel due to vibration or the like when the vehicle travels.

SUMMARY

Illustrative aspects of the present invention provide a grommet assembly which can be easily mounted to a panel regardless of a shape of a portion of the panel to which the grommet assembly is mounted.

According to an illustrative aspect of the invention, a grommet assembly includes an inner member that includes a first half portion and a second half portion, each having a body portion to be fitted into a mounting hole of a panel a panel engagement portion formed on the body portion and configured to be engaged with an opening edge of the mounting hole, a grommet configured to be mounted to a rear side of the inner member, the grommet including an annular panel contact portion having a seal part configured to contact a surface of a portion of the panel surrounding the mounting hole, and a tubular wire housing portion connected to the panel contact portion and configured to cover an electric wire such that the electric wire is bent with respect to a center axis of the mounting hole and a first protruding part protruding in a first direction from a rear side of the first half portion toward a rear wall of the wire housing portion. The inner member is configured to be dividable into the first half portion and the second half portion along a direction in which the body portion of each of the first half portion and the second half portion is fitted into the mounting hole of the panel. The first protruding part includes a first hook portion bent back at a protruding end of the first protruding part toward a second direction opposite to the first direction, the first hook portion including a first pressing support portion including the protruding end of the first protruding part and extending along an inner surface of the rear wall of the wire housing portion.

Other aspects and advantages of the invention will be apparent from the following description, the drawings and the claims.

BRIEF DESCRIPTION OF DRAWINGS

FIG. 7 is an exploded perspective view of a grommet assembly according to a reference example;

DESCRIPTION OF EMBODIMENTS

Figure 1:
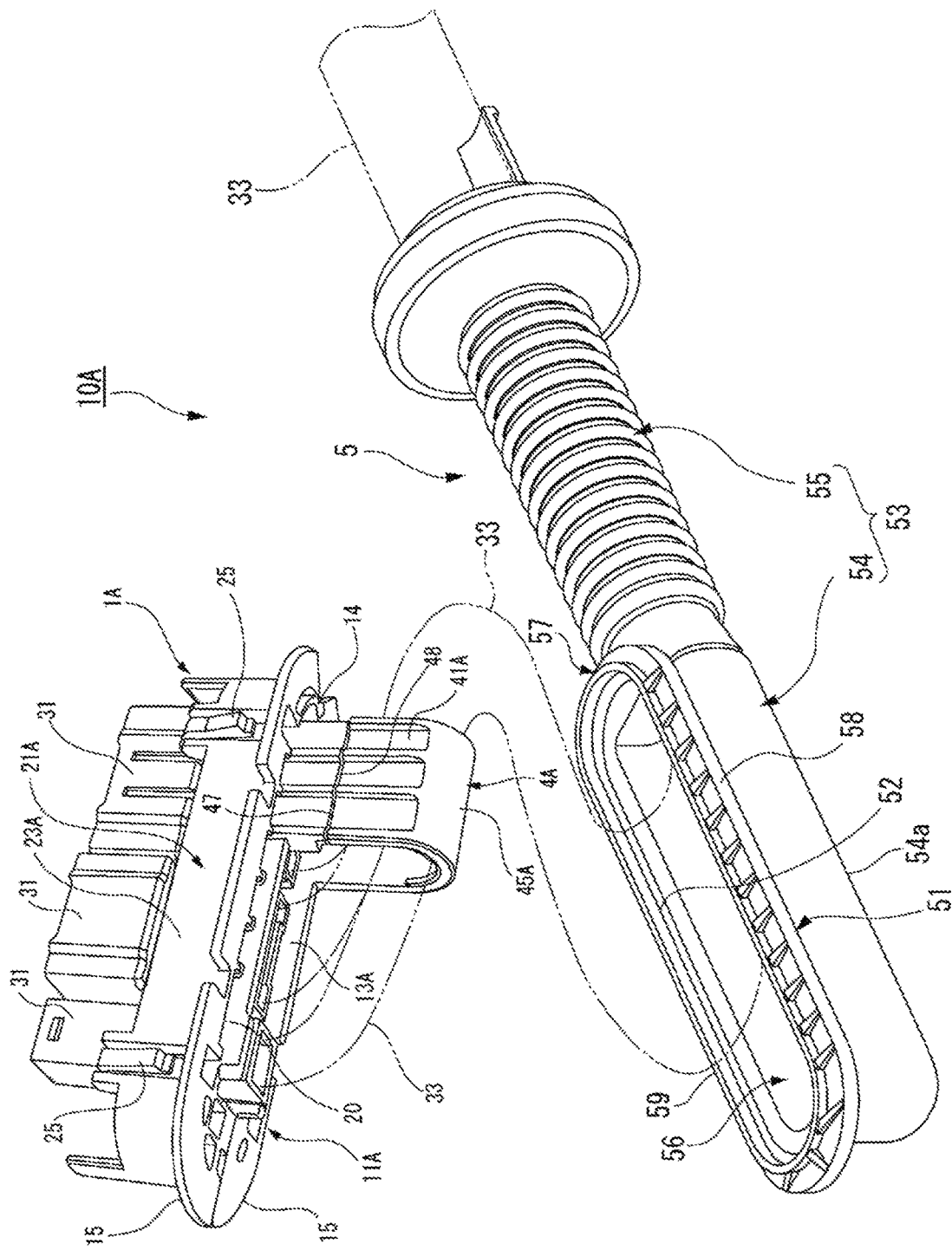
FIG. 1 is an exploded perspective view of a grommet assembly according to a first embodiment of the present invention.
Figure 2:
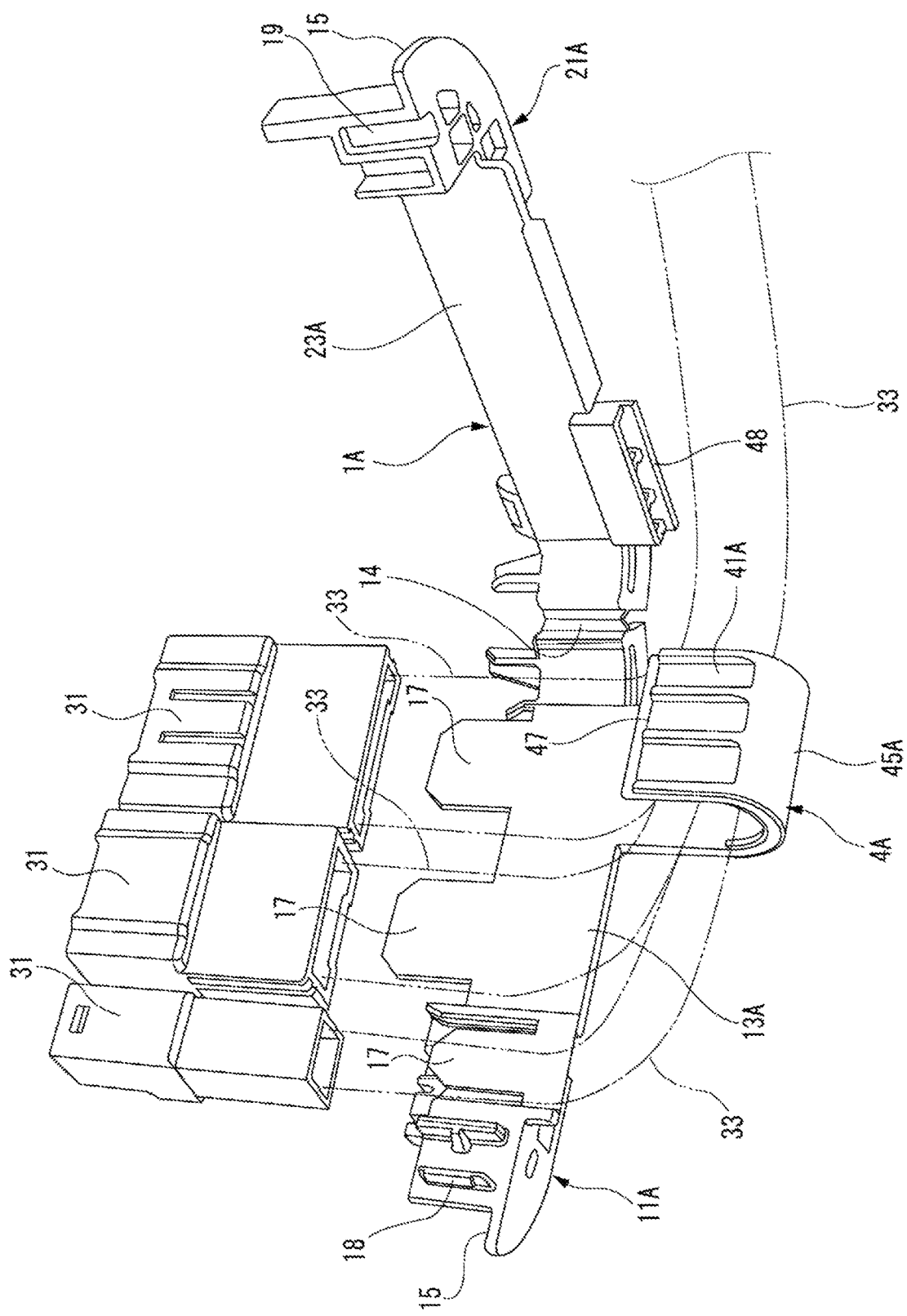
FIG. 2 is a perspective view showing an inner member shown in FIG. 1 during assembly.
Figure 3:
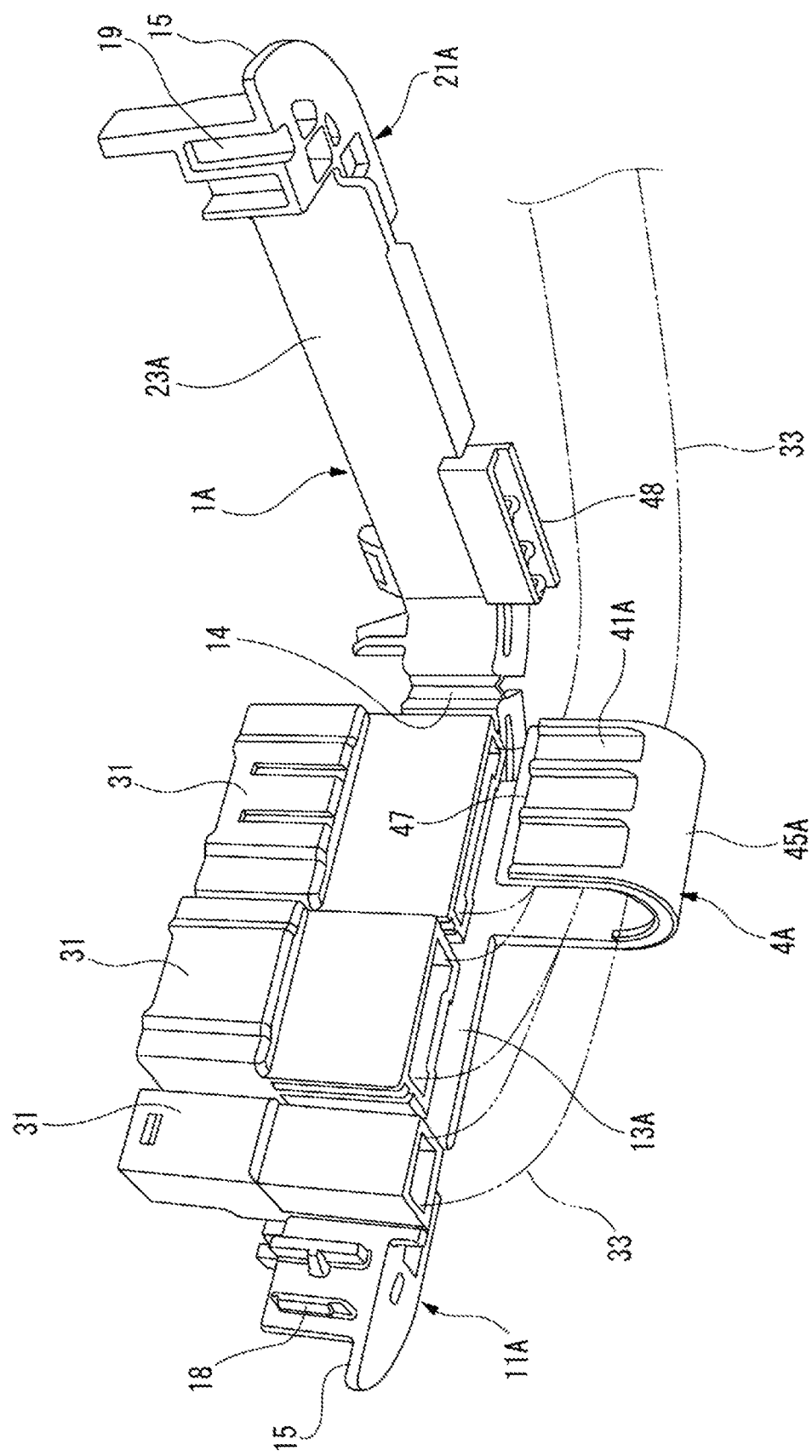
FIG. 3 is an exploded perspective view showing a state in which the inner member and a connector shown in FIG. 2 are assembled.
Figure 4:
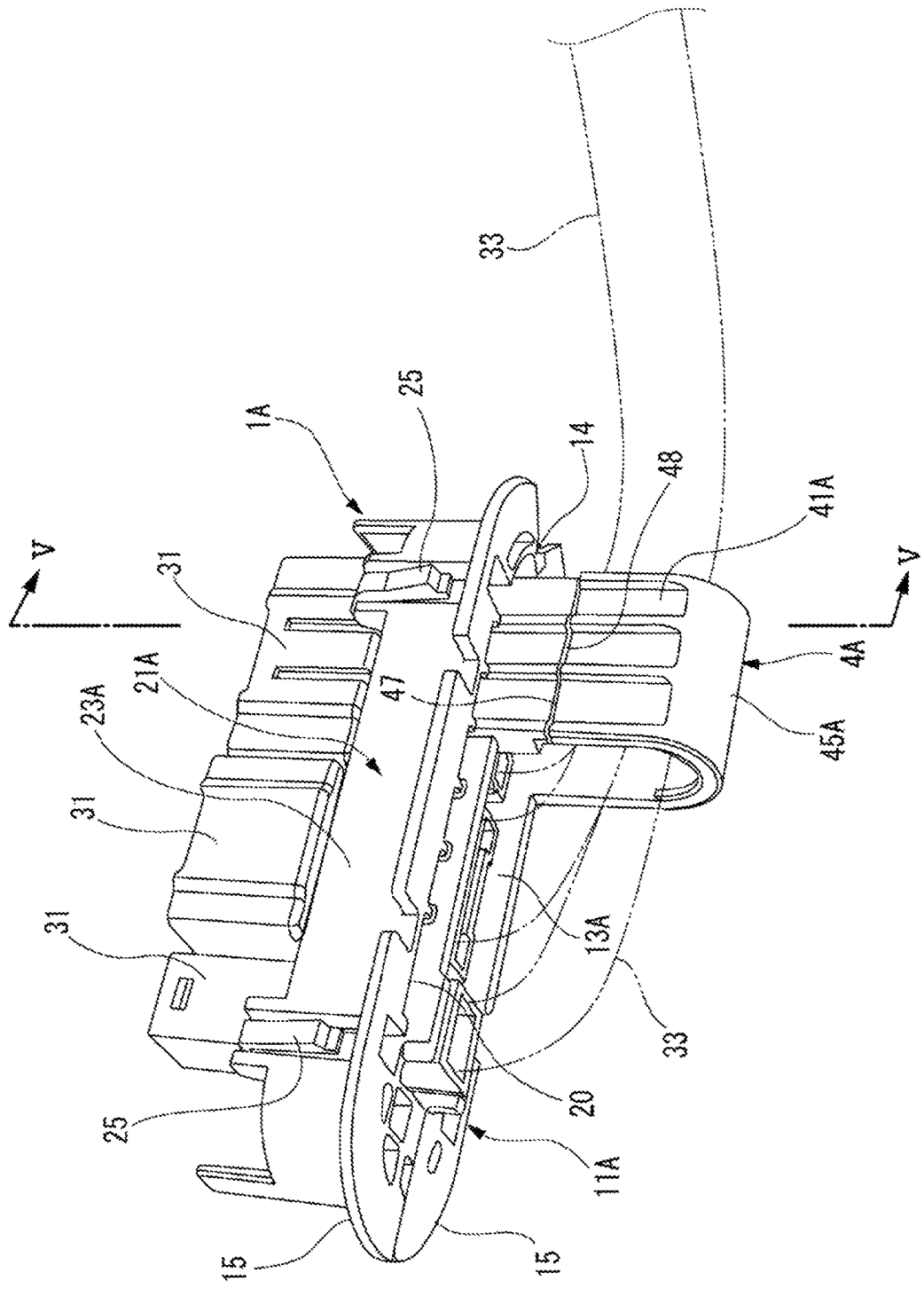
FIG. 4 is a perspective view showing a state in which the assembly of the inner member shown in FIG. 3 is completed.
Figure 5:
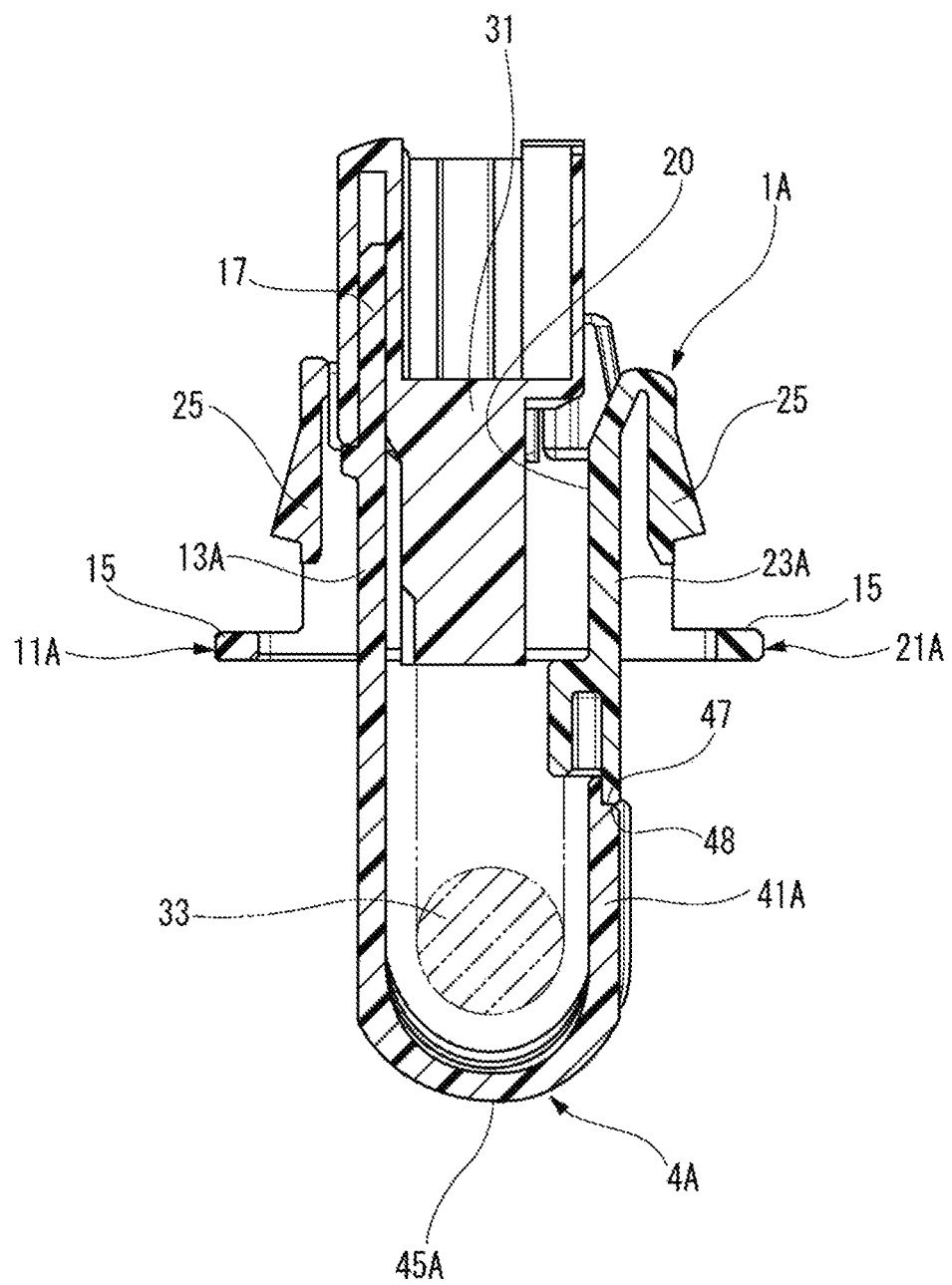
FIG. 5 is a sectional view taken along a line V-V in FIG. 4.
Figure 6A:
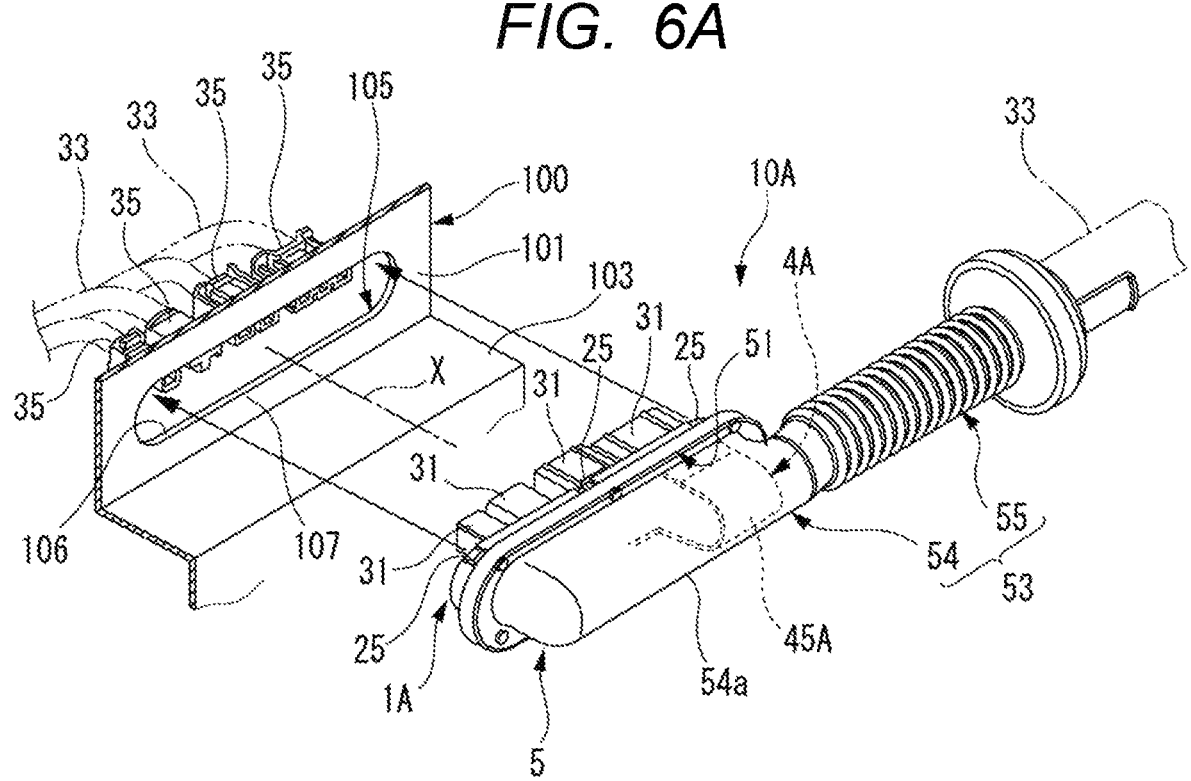
FIG. 6A is a perspective view of the grommet assembly before being mounted to the panel.
Figure 6B:
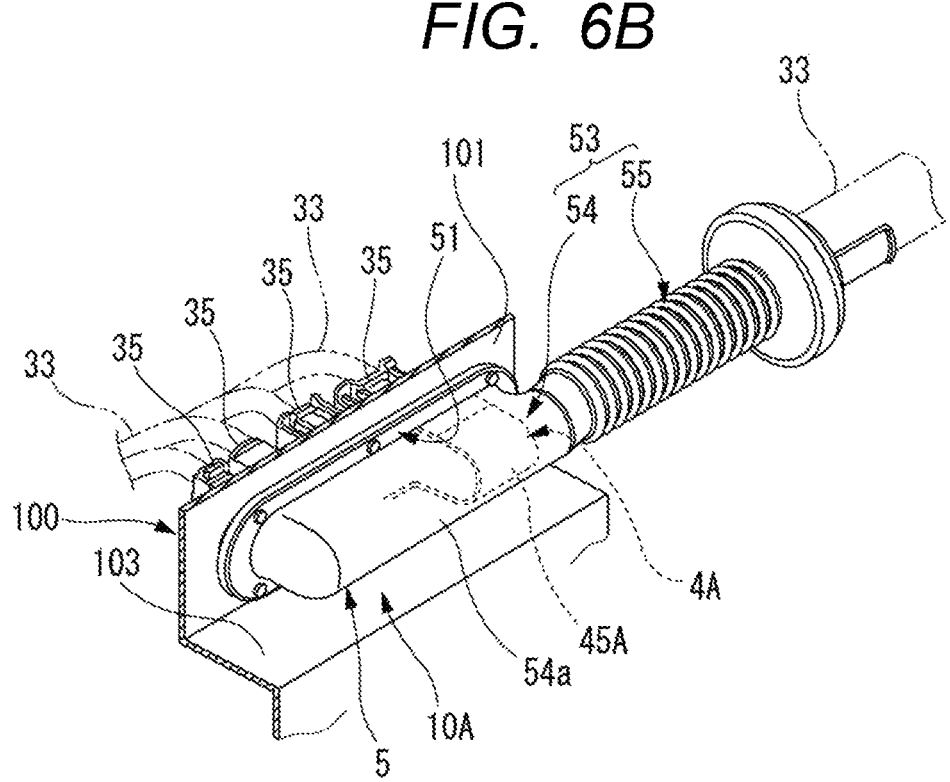
FIG. 6B is a perspective view of the grommet assembly after being mounted to the panel.

Hereinafter, exemplary embodiments of the present invention will be described in detail with reference to the drawings. FIG. 1 is an exploded perspective view of a grommet assembly 10A according to a first embodiment of the present invention. FIG. 2 is a perspective view showing an inner member 1A shown in FIG. 1 during assembly. FIG. 3 is an exploded perspective view showing a state in which the inner member 1A and a connector 31 shown in FIG. 2 are assembled. FIG. 4 is a perspective view showing a state in which the assembly of the inner member 1A shown in FIG. 3 is completed. FIG. 5 is a sectional view taken along a line V-V in FIG. 4. FIG. 6A is a perspective view of the grommet assembly before being mounted to the panel. FIG. 6B is a perspective view of the grommet assembly after being mounted to the panel.

The grommet assembly 10A according to the first embodiment includes the inner member 1A, a first protruding portion 4A, and a grommet 5, as shown in FIGS. 1 and 5. The grommet assembly 10A is fitted in and assembled in a mounting hole 105 formed in the panel 100 on a back door side. The grommet assembly 10A is, for example, assembled with a wire harness (electric wires) 33 routed between a vehicle body and a back door in a vehicle such as an automobile to protect and waterproof the wire harness 33.

As shown in FIG. 1, the grommet 5 is integrally molded by an elastic material such as rubber or elastomer, and includes an annular panel contact portion 51 configured to bring a seal part 57 into contact with a surface of a portion 107 of the panel 100 surrounding the mounting hole 105, and a tubular wire housing portion 53 connected to the panel contact portion 51 and configured to cover the wire harness 33 such that the wire harness 33 is bent with respect to the center axis X of the mounting hole 105.

The panel contact portion 51 is formed in an elongated shape. The panel contact portion 51 has a seal part 57 to be pressed and brought into contact with the surface of the portion 107 of the panel 100 surrounding the mounting hole 105, a base part 58 which is a base portion of the seal part 57, and an oval opening part 56 communicating with an internal space of the tubular wire housing portion 53.

Figure 15:
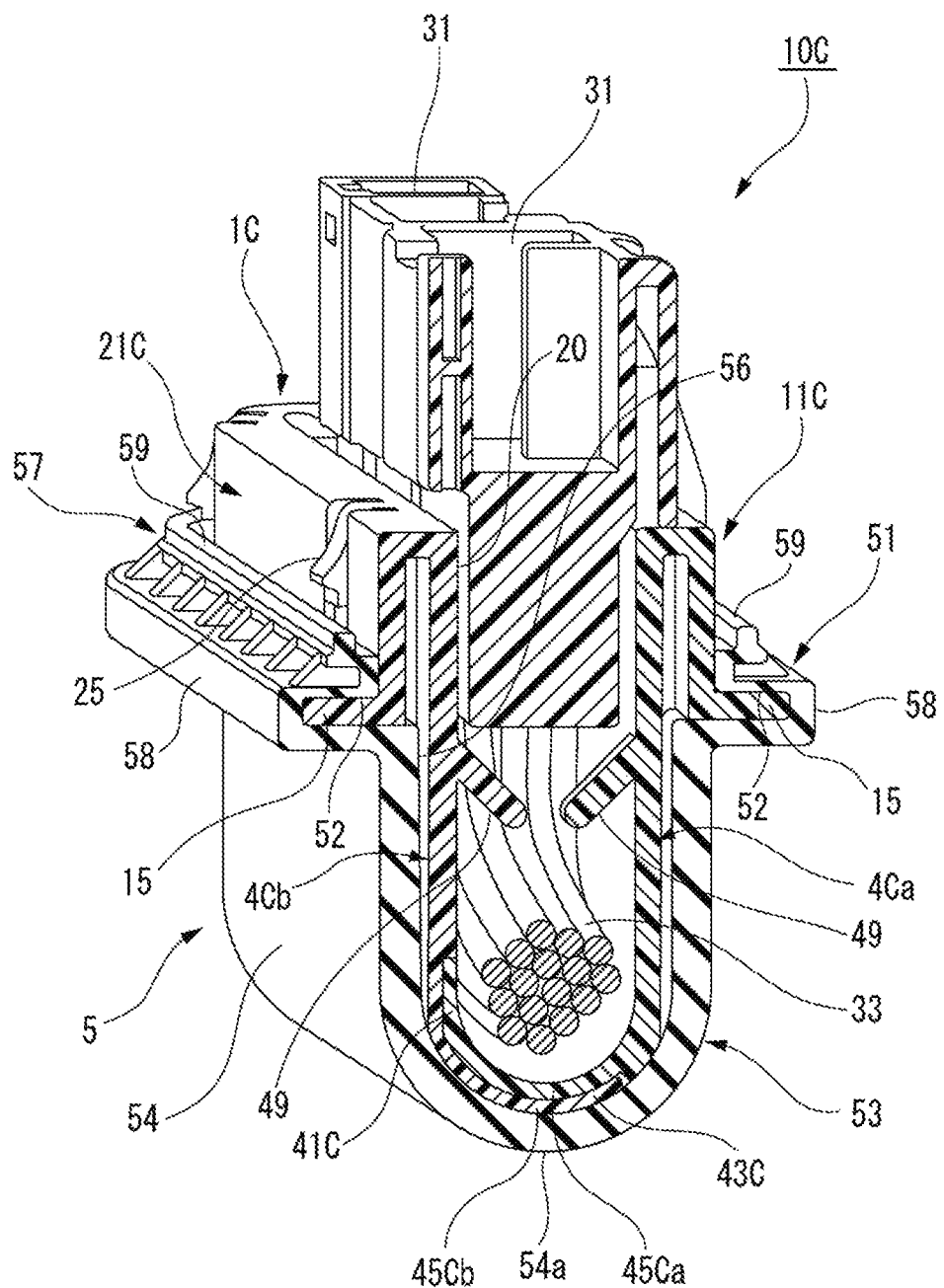
FIG. 15 is a sectional view taken along a line XV-XV in FIG. 14.

The seal part 57 has a lip portion 59 formed so as to be easily bent when a pressing force is applied (see FIG. 15). The lip portion 59 is formed so as to be watertight against the surface of the portion 107 of the panel 100 surrounding the mounting hole 105.

The base part 58 is formed around the oval opening part 56. Therefore, the base part 58 is formed in a substantially frame-shaped portion in the panel contact portion 51. The lip portion 59 is integrally formed on an opposite surface of the base part 58 facing the surface of the portion 107 of the panel 100 surrounding the mounting hole 105. A flange fitting groove 52 is formed on an inner peripheral surface (inner side of the panel contact portion 51) of the base part 58.

The flange fitting groove 52 is formed as a fitting portion for a flange portion 15 of the inner member 1A described later. The flange fitting groove 52 is formed in a groove shape such that the entire periphery of the flange portion 15 can be inserted in. That is, the inner peripheral surface of the base part 58 is recessed toward an outer peripheral surface, and the recess is formed in a groove shape continuous in the entire periphery. The flange fitting groove 52 is formed as a space in contact with a front surface and a rear surface of the flange portion 15. Therefore, the base part 58 having such a flange fitting groove 52 is formed in a U-shaped cross section.

The wire housing portion 53 includes a direction changing tubular portion 54 which bends the wire harness 33 to change a drawing direction, and a bellows-shaped tubular portion 55 as a portion which can be bent freely. The direction changing tubular portion 54 is integrally formed at a rear side of the panel contact portion 51. A ceiling (rear wall) 54a is formed in the direction changing tubular portion 54 such that the wire harness 33 can be changed to an orthogonal direction after being drawn out from the connector 31 fixed to the inner member 1A.

As shown in FIGS. 1 to 5, the inner member 1A is made of a hard synthetic resin with insulating property. Here, the hard synthetic resin is a material that hardly elastically deforms or has a much smaller amount of elastic deformation as compared with the elastic material configuring the grommet 5. As shown in FIG. 2, the inner member 1A is configured by a first half portion 11A and a second half portion 21A divided into two in a longitudinal direction along an fitting direction, a direction in which the body portion is fitted into the mounting hole of the panel (center axis X direction of the mounting hole 105) into a flat tubular body having an oval opening.

As shown in FIGS. 2 and 3, the first half portion 11A and the second half portion 21A are configured such that a linear portion of a body portion 13A formed in a semi-oval shape and a linear portion of a body portion 23A formed in a semi-elliptical shape face each other, and one end portion of the first half portion 11A and one end portion of the second half portion 21A are connected with each other by a thin hinge 14. The one end of the first half portion 11A and the one end portion of the second half portion 21A are rotatably connected to each other by the elastically deformable thin hinge 14, so that the other end portion of the first half portion 11A and the other end portion of the second half portion 21A come close to and separate from each other.

A locking protrusion 18 formed in an arm shape protruding toward the other end of the second half portion 21A is formed on the other end of the first half portion 11A. A locking recess 19 which is a recessed groove in which the locking protrusion 18 of the first half portion 11A can enter and being locked is formed on the other end of the second half portion 21A.

When the locking protrusion 18 and the locking recess 19 are locked, the first half portion 11A and the second half portion 21A are formed in an oval tubular shape in which the body portions 13A, 23A are combined as opposed walls, and the shape matches an opening shape of the mounting hole 105 of the panel 100. Panel engagement portions 25 to be engaged with an opening edge 106 of the mounting hole 105 are formed on the outer periphery of the body portions 13A, 23A at a front end side. The panel engagement portion 25 is formed in a cantilever arm shape and has elasticity. The panel engagement portion 25 is formed with an outward protrusion at a front end. In the first embodiment, the body portions 13A, 23A are each formed with two panel engagement portions 25.

A first protruding part 4A having a first pressing support portion 45A extending along an inner surface of the ceiling 54a of the wire housing portion 53 is provided on a rear side of a body portion 13A in the first half portion 11A. The first protruding part 4A is integrally formed with a body portion 13A and is formed in a substantially U shape, which protrudes toward the ceiling 54a of the wire housing portion 53 of the mounted grommet 5. The first protruding part 4A further includes a first hook portion 41A bent back at a protruding end of the first protruding part 4A in an opposite direction to which the first protruding part 4A protrudes (downward in FIG. 2), the first hook portion including a first pressing support portion 45A that extends along an inner surface of the rear wall 54a of the wire housing portion. An engagement step portion 47 to be engaged with a support step portion 48 provided on the rear side of the body portion 23A of the second half portion 21A is formed at a distal end of the first hook portion 41A.

As shown in FIGS. 4 and 5, flange portions 15 protruding outward are respectively formed on the outer periphery of the body portions 13A, 23A at the rear side. The flange portion 15 is configured to face the surface of the portion 107 of the panel 100 surrounding the mounting hole 105 so as to be parallel to the surface of the portion 107 of the panel 100 surrounding the mounting hole 105.

As shown in FIG. 2, a plurality of fix portions 17 for fixing the connectors 31 connected to electric wire ends of the wire harnesses 33 are formed in the body portion 13A of the first half portion 11A. The fix portion 17 is a locking protrusion protruding in a connector fitting direction, and is configured to lock a lock portion of the connector 31 so as to fix the connector 31 to the inner member 1A. As shown in FIGS. 6A and 6B, the connectors 31 are to be fitted in mating connectors 35 provided in the panel 100 on a back door side, and are configured to be electrically connected to the wire harnesses 33 on the back door side.

Next, an assembling operation of the grommet assembly 10A for mounting the grommet 5 on the inner member 1A will be described. First, as shown in FIG. 2, in a state where the other end portions of the first half portion 11A and second half portion 21A are separated from each other, the connectors 31 connected to the ends of the wire harnesses 33 passing through the grommet 5 are fixed to the fix portions 17 of the body portion 13A. At this time, the workability is favorable since the wire harnesses 33 drawn out from the connectors 31 are routed and organized in the first hook portion 41A of the first protruding part 4A.

As shown in FIG. 4, when the one end portions of the first half portion 11A and second half portion 21A are close to each other and the locking protrusion 18 is locked to the locking recess 19, the wire harnesses 33 are inserted into an oval opening 20 of the inner member 1A. That is, the inner member 1A is configured by the first half portion 11A and the second half portion 21A divided in two, so that it is not necessary to pass the wire harnesses 33 through the oval opening 20 first, and the assemblability is improved.

When the locking protrusion 18 and the locking recess 19 are locked, the body portions 13A, 23A are combined as opposed walls, so that the engagement step portion 47 of the first hook portion 41A is engaged with the support step portion 48. By being engaged with the engagement step portion 47, the support step portion 48 can transmit a pressing force transmitted to the first hook portion 41A to the body portion 23A when the pressing force is applied on the first pressing support portion 45A of the first protruding part 4A.

As shown in FIG. 1, the panel contact portion 51 of the grommet 5 is brought close to a rear side of the inner member 1A from which the first protruding part 4A protrudes. Next, the flange portions 15 of the inner member 1A are inserted into the flange fitting groove 52 of the panel contact portion 51, and the flange portions 15 are covered by the flange fitting groove 52 over the entire periphery. Therefore, the mounting of the grommet 5 to the inner member 1A is completed, and the assembling of the grommet assembly 10A is completed.

Next, the mounting operation when mounting the grommet assembly 10A according to the first embodiment to the panel 100 will be described. As shown in FIG. 6A, a long oval mounting hole 105 is formed in the panel 100. Here, in a mounting panel 101 in which the mounting hole 105 is formed, a vertical panel 103 is provided in the vicinity of the mounting hole 105.

First, the body portions 13A, 23A of the inner member 1A in the grommet assembly 10A are fitted into the mounting hole 105 to engage the panel engagement portion 25 with the opening edge 106 of the mounting hole 105, and the seal part 57 of the panel contact portion 51 is pressed against and brought into tight contact with the surface of the portion 107 of the panel 100 surrounding the mounting hole 105.

At this time, since the vertical panel 103 is provided in the vicinity of the mounting hole 105, there is not a sufficient space for the operator's hand to get in on a vertical panel 103 side of the grommet assembly 10A, and it is not possible to press the panel contact portion 51 on the vertical panel 103 side with a finger. However, according to the grommet assembly 10A of the first embodiment, the first pressing support portion 45A of the first protruding part 4A provided to protrude from the rear side of the body portion 13A of the inner member 1A is disposed along the inner surface of the ceiling 54a of the wire housing portion 53 of the grommet 5.

Therefore, when mounting the grommet assembly 10A to the panel 100, the ceiling 54a of the wire housing portion 53 is pressed from above with a finger, so that the inner surface of the ceiling 54a of the elastically deformed wire housing portion 53 comes into contact with the first pressing support portion 45A of the first protruding part 4A, and the pressing force is transmitted to the first protruding part 4A. That is, the pressing force applied by the operator on the grommet assembly 10A is reliably transmitted to the panel engagement portions 25 of the body portions 13A and 23A through the first protruding part 4A.

Therefore, the panel engagement portions 25 can be reliably engaged with the opening edge 106 of the mounting hole 105 by pressing the ceiling 54a of the wire housing portion 53 with a finger, and the mounting work to the panel 100 can be easily performed regardless of the panel shape of the mounting position.

Figure 8:
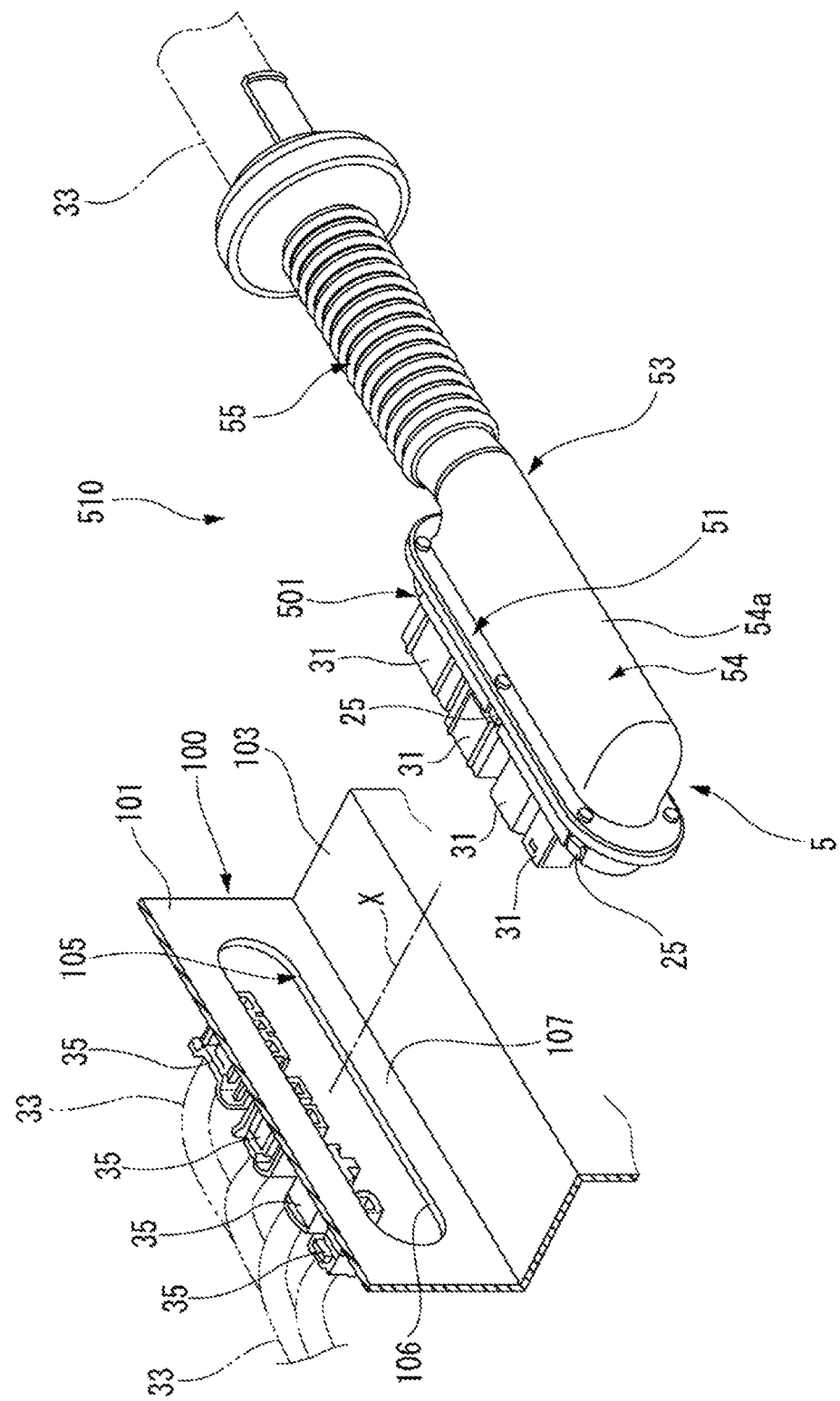
FIG. 8 is a perspective view before the grommet assembly shown in FIG. 7 is mounted to the panel.

FIG. 7 is an exploded perspective view of a grommet assembly 510 according to a reference example. FIG. 8 is a perspective view before the grommet assembly 510 shown in FIG. 7 is mounted to the panel 100. In the grommet assembly 510 according to the reference example, the same configurations as those of the grommet assembly 10A according to the first embodiment are denoted by the same reference numerals, and the descriptions thereof are omitted.

The grommet assembly 510 according to the reference example includes an inner member 501 and the grommet 5 as shown in FIG. 7. The inner member 501 is configured by a first half portion 511 and a second half portion 521 divided into two in a longitudinal direction along an fitting direction (center axis X direction of the mounting hole 105) into a flat tubular body having oval opening.

In the reference example, the body portions 13A, 23A are each formed with three panel engagement portions 25. The assembling operation of the grommet assembly 510 for mounting the grommet 5 to the inner member 501 is the same as the assembling operation of the grommet assembly 10A of the first embodiment.

Next, the mounting operation when mounting the grommet assembly 510 according to the reference example to the panel 100 will be described. First, the body portions 13A, 23A of the inner member 501 in the grommet assembly 510 are fitted into the mounting hole 105 to engage the panel engagement portion 25 with the opening edge 106 of the mounting hole 105, and the seal part 57 of the panel contact portion 51 is pressed against and brought into tight contact with the surface of the portion 107 of the panel 100 surrounding of the mounting hole 105.

At this time, it is necessary to engage the panel engagement portions 25 with the opening edge 106 of the mounting hole 105 by pressing the panel contact portion 51 on both sides of the direction changing tubular portion 54 of the grommet 5 with a finger. However, since the vertical panel 103 is provided in the vicinity of the mounting hole 105, there is no sufficient space for the operator's hand to get in on a vertical panel 103 side of the grommet assembly 510, and it is not possible to press the panel contact portion 51 on the vertical panel 103 side with a finger.

Further, since the grommet 5 is made of an elastic material, the grommet 5 will be elastically deformed even if the ceiling 54a of the wire housing portion 53 is pressed. Therefore, even if the ceiling 54a of the wire housing portion 53 is pressed, the pressing force is not sufficiently transmitted to the panel contact portion 51, and the panel engagement portions 25 cannot be reliably locked to the opening edge 106 of the mounting hole 105.

On the other hand, in the grommet assembly 10A of the first embodiment, the panel engagement portions 25 can be reliably engaged with the opening edge 106 of the mounting hole 105 through the first protruding part 4A provided on the inner member 1A by pressing the ceiling 54a of the wire housing portion 53 with a finger as described above. Therefore, the grommet assembly 10A of the first embodiment can be easily mounted to the panel 100 regardless of the panel shape of a mounting position.

According to the grommet assembly 10A of the first embodiment, the flange portions 15 of the body portions 13A and 23A of the inner member 1A are inserted into the flange fitting groove 52 of the panel contact portion 51 of the grommet 5. Therefore, when mounting the grommet assembly 10A to the panel 100, a pressing force is transmitted to the flange portions 15 of the body portions 13A and 23A by pressing the panel contact portion 51 of the grommet 5 with a finger. That is, the pressing force applied by the operator on the grommet assembly 10A is reliably transmitted to the panel engagement portions 25 of the body portions 13A and 23A through the flange portions 15. Therefore, the panel engagement portions 25 can be reliably engaged with the opening edge 106 of the mounting hole 105 by pressing at least one of the panel contact portion 51 and the wire housing portion 53 of the grommet 5 with a finger, and the operation of mounting the grommet assembly to the panel 100 can be further improved.

Figure 9:
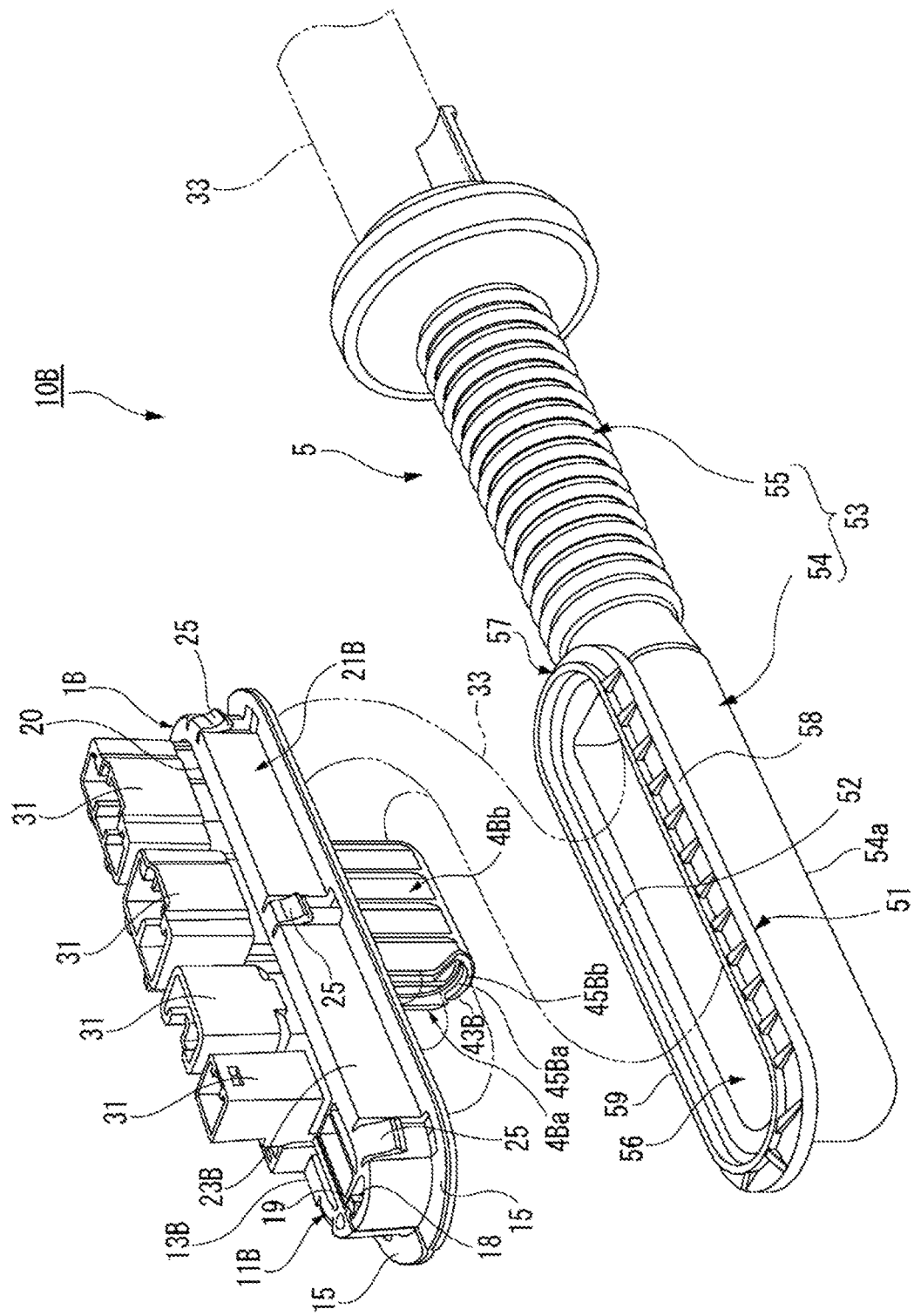
FIG. 9 is an exploded perspective view of a grommet assembly according to a second embodiment of the present invention.
Figure 10:
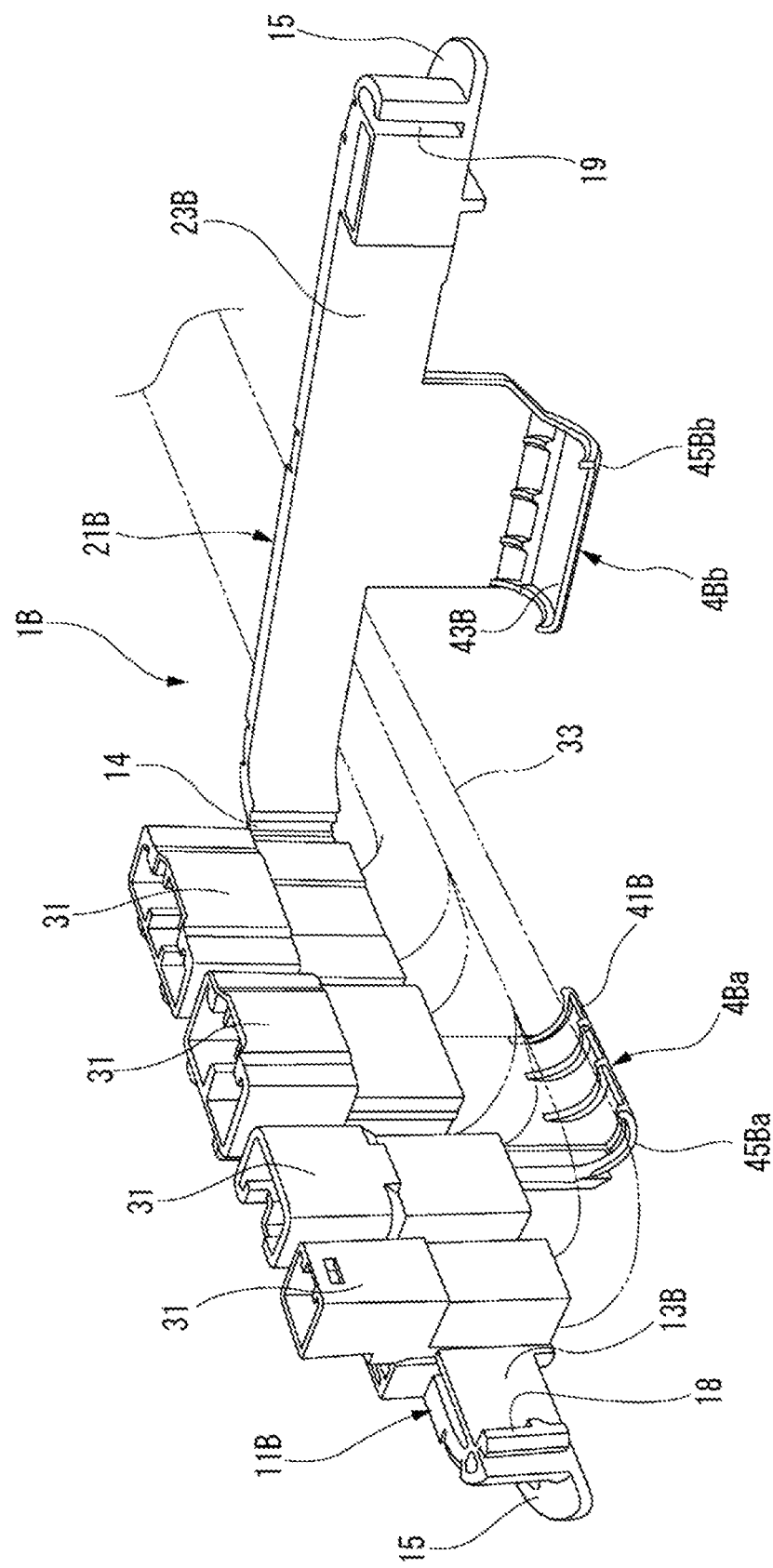
FIG. 10 is a perspective view showing an inner member shown in FIG. 9 during assembly.
Figure 11:
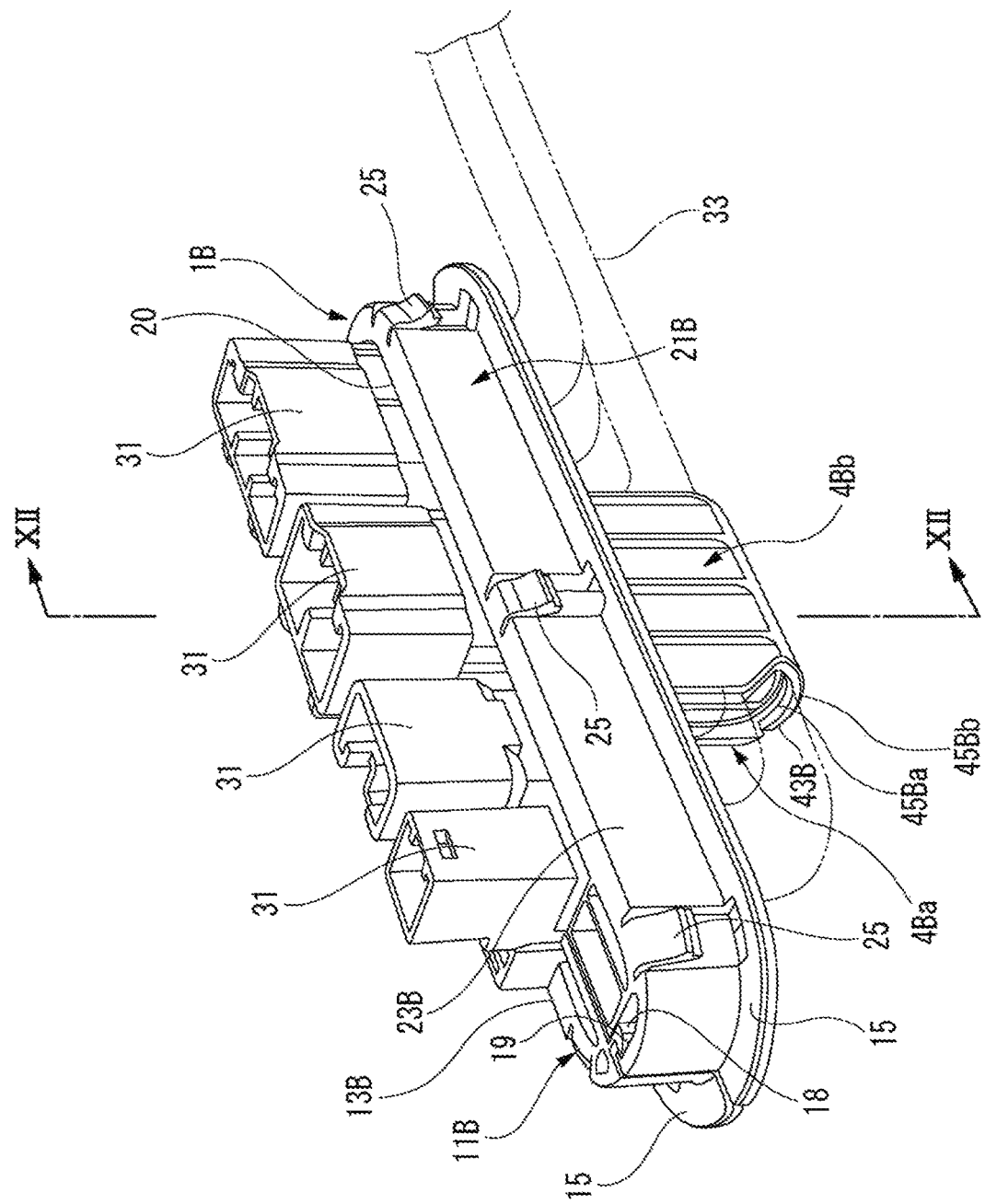
FIG. 11 is a perspective view showing a state in which the inner member shown in FIG. 10 is assembled.
Figure 12:
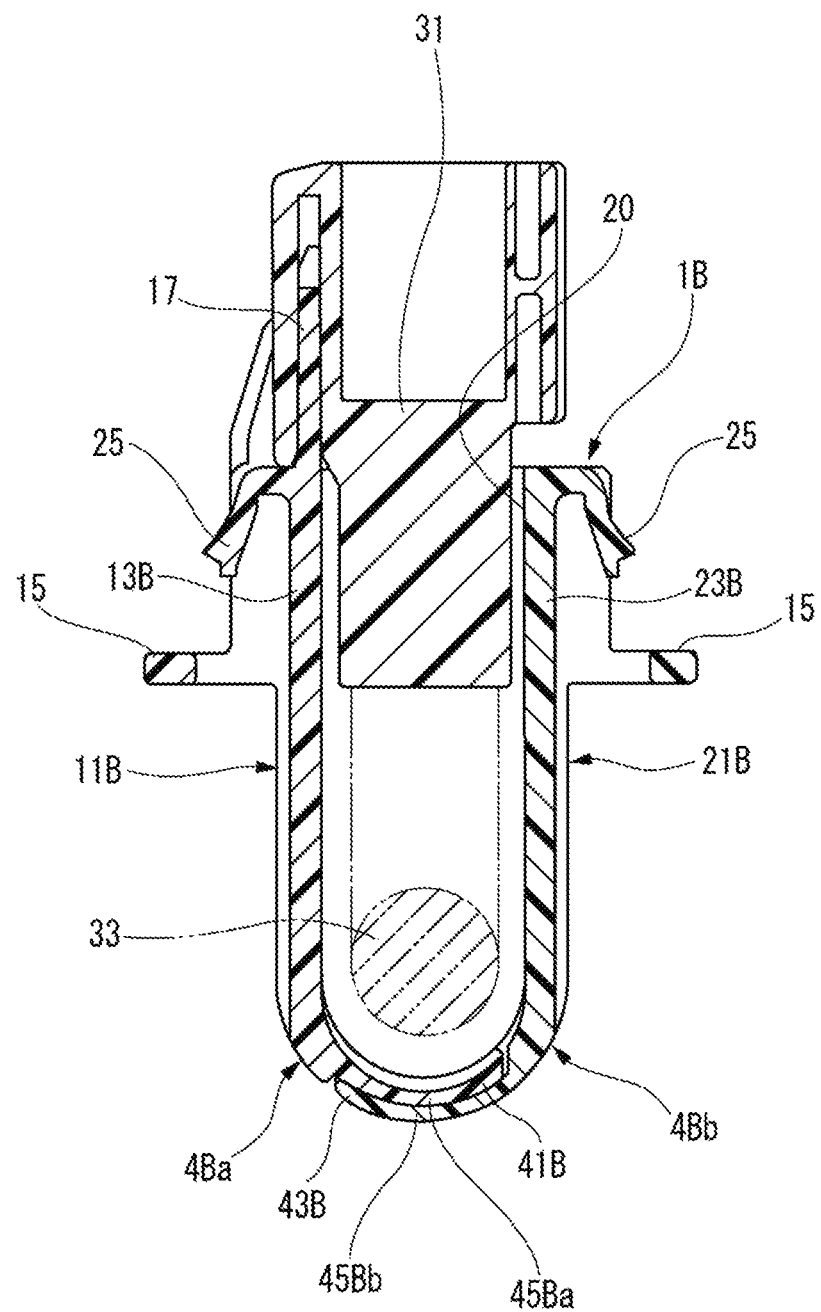
FIG. 12 is a sectional view taken along a line XII-XII in FIG. 11.

FIG. 9 is an exploded perspective view of a grommet assembly 10B according to a second embodiment of the present invention. FIG. 10 is a perspective view showing an inner member 1B shown in FIG. 9 during assembly. FIG. 11 is a perspective view showing a state in which the inner member 1B shown in FIG. 10 is assembled. FIG. 12 is a sectional view taken along a line XII-XII in FIG. 11. In the inner member 1B according to the second embodiment, the same configurations as those of the inner member 1A according to the first embodiment are denoted by the same reference numerals, and the descriptions thereof are omitted.

As shown in FIG. 10, the inner member 1B according to the second embodiment of the present invention includes a first half portion 11B and a second half portion 21B that are dividable from each other along a fitting direction (center axis X direction of the mounting hole 105) into a flat tubular body having oval opening.

A first protruding part 4Ba having a first pressing support portion 45Ba extending along an inner surface of the ceiling 54a of the wire housing portion 53 is provided on a rear side of a body portion 13B in the first half portion 11B. The first protruding part 4Ba is integrally formed with a body portion 13B and is formed in a substantially J shape, which protrudes toward the ceiling 54a of the wire housing portion 53 of the mounted grommet 5. The first protruding part 4B further includes a first hook portion 41B bent back at a protruding end of the first protruding part 4B in an opposite direction to which the first protruding part 4B protrudes (downward in FIG. 10), the first hook portion including a first pressing support portion 45Ba that extends along an inner surface of the rear wall 54a of the wire housing portion.

A second protruding part 4Bb having a second pressing support portion 45Bb extending along an inner surface of the ceiling 54a of the wire housing portion 53 is provided on a rear side of a body portion 23B in the second half portion 21B. The second protruding part 4Bb is integrally formed with a body portion 23B and is formed in a substantially J shape, which protrudes toward the ceiling 54a of the wire housing portion 53 of the mounted grommet 5. The second protruding part 4Bb further includes a second hook portion 43B bent back at a protruding end of the second protruding part 4Bb in an opposite direction to which the second protruding part 4Bb protrudes (downward in FIG. 10) such that the second hook portion covers the first pressing support portion 45Bb, the second hook portion 43B including a second pressing support portion 45Bb that extends along an inner surface of the rear wall 54a of the wire housing portion.

As shown in FIG. 10, in a state where the other end portions of the first half portion 11B and second half portion 21B are separated from each other, the connectors 31 configured to be connected to the ends of the wire harnesses 33 passing through the grommet 5 are fixed to the fix portions 17 of the body portion 13B. At this time, the workability is favorable since the wire harnesses 33 drawn out from the connectors 31 are to be routed and organized in the first hook portion 41B of the first protruding part 4Ba.

Next, as shown in FIG. 11, when the one end portions of the first half portion 11B and second half portion 21B are brought close to each other and the locking protrusion 18 is locked to the locking recess 19, the wire harnesses 33 are to be inserted into an oval opening 20 of the inner member 1B. When the locking protrusion 18 and the locking recess 19 are locked, the body portions 13B, 23B are combined as opposed walls, so that the first pressing support portion 45Ba of the first protruding part 4Ba and the second pressing support portion 45Bb of the second protruding part 4Bb overlap.

As shown in FIG. 12, since the first pressing support portion 45Ba and the second pressing support portion 45Bb overlap, a pressing force applied to the second pressing support portion 45Bb can be transmitted to the first pressing support portion 45Ba when the pressing force is applied on the second pressing support portion 45Bb of the second protruding part 4Bb. Then, the pressing force transmitted to the first pressing support portion 45Ba can be transmitted to the body portion 13B through the first protruding part 4Ba.

Similar to the inner member 1A of the first embodiment, according to the second embodiment, the panel contact portion 51 of the grommet 5 is brought close to a rear side of the inner member 1B from which the first protruding part 4Ba and the second protruding part 4Bb protrude as shown in FIG. 9. Next, the flange portions 15 of the inner member 1B are inserted into the flange fitting groove 52 of the panel contact portion 51, and the flange portions 15 are covered by the flange fitting groove 52 over the entire periphery, so that the mounting of the grommet 5 to the inner member 1B is completed.

Therefore, according to the grommet assembly of the second embodiment in which the grommet 5 is mounted on the inner member 1B, the first pressing support portion 45Ba of the first protruding part 4Ba that protrudes from the rear side of the body portion 13B in the first half portion 11B, and the second pressing support portion 45Bb of the second protruding part 4Bb that protrudes from the rear side of the body portion 23B in the second half portion 21B are disposed along the inner surface of the ceiling 54a of the wire housing portion 53 of the grommet 5.

Therefore, when mounting the grommet assembly to the panel, the ceiling 54a of the wire housing portion 53 is pressed from above with a finger, so that the inner surface of the ceiling 54a of the elastically deformed wire housing portion 53 comes into contact with the second pressing support portion 45Bb of the second protruding part 4Bb, and the pressing force is transmitted to the first protruding part 4Ba through the first pressing support portion 45Ba. That is, the pressing force applied by the operator on the grommet assembly is reliably transmitted to the panel engagement portions 25 of the body portion 13B and body portion 23B through the first protruding part 4Ba and the second protruding part 4Bb.

Therefore, the panel engagement portions 25 can be reliably engaged with the opening edge 106 of the mounting hole 105 by pressing the ceiling 54a of the wire housing portion 53 with a finger. Therefore, similar to the grommet assembly 10A of the first embodiment, the grommet assembly 10B according to the second embodiment can be easily mounted to the panel 100 regardless of the panel shape of a mounting position.

Further, according to the grommet assembly 10B of the second embodiment, the body portions 13B, 23B fitted into the mounting hole 105 having the oval opening are formed in an oval tubular shape having the oval opening 20. The first protruding part 4Ba and the second protruding part 4Bb are formed in an arch shape protruding from the rear side of the body portions 13B, 23B which are combined as opposed walls so as to bridge the oval opening 20 in the lateral direction of the oval opening 20, and are disposed at substantially central positions on the body portions 13B, 23B with respect to the longitudinal direction of the oval opening 20.

Therefore, when mounting the grommet assembly to the panel, the pressing force transmitted to the first protruding part 4Ba and the second protruding part 4Bb in the substantially central position can be easily and uniformly transmitted to the entire body portion of the body portions 13B, 23B in the elongated inner member 1B, and the plurality of panel engagement portions 25 formed in the body portions 13B, 23B can be reliably engaged with the opening edge 106 of the mounting hole 105.

Further, the first protruding part 4Ba and the second protruding part 4Bb formed in the arch shape so as to be bridged between the body portions 13B, 23B which are combined as opposed walls at the substantially central positions on the body portions 13B, 23B with respect to the longitudinal direction of the oval opening 20 can increase the rigidity of the body portions 13B, 23B at the substantially central positions having relatively low rigidity due to being formed into the oval tubular shape having the oval opening 20, and can prevent the deformation of the body portions 13B, 23B. Therefore, it is possible to prevent the case where the body portions 13B, 23B fitted into the mounting hole 105 of the panel 100 are deformed inward, and the panel engagement portions 25 are not able to engage with the opening edge 106 of the mounting hole 105.

Figure 13:
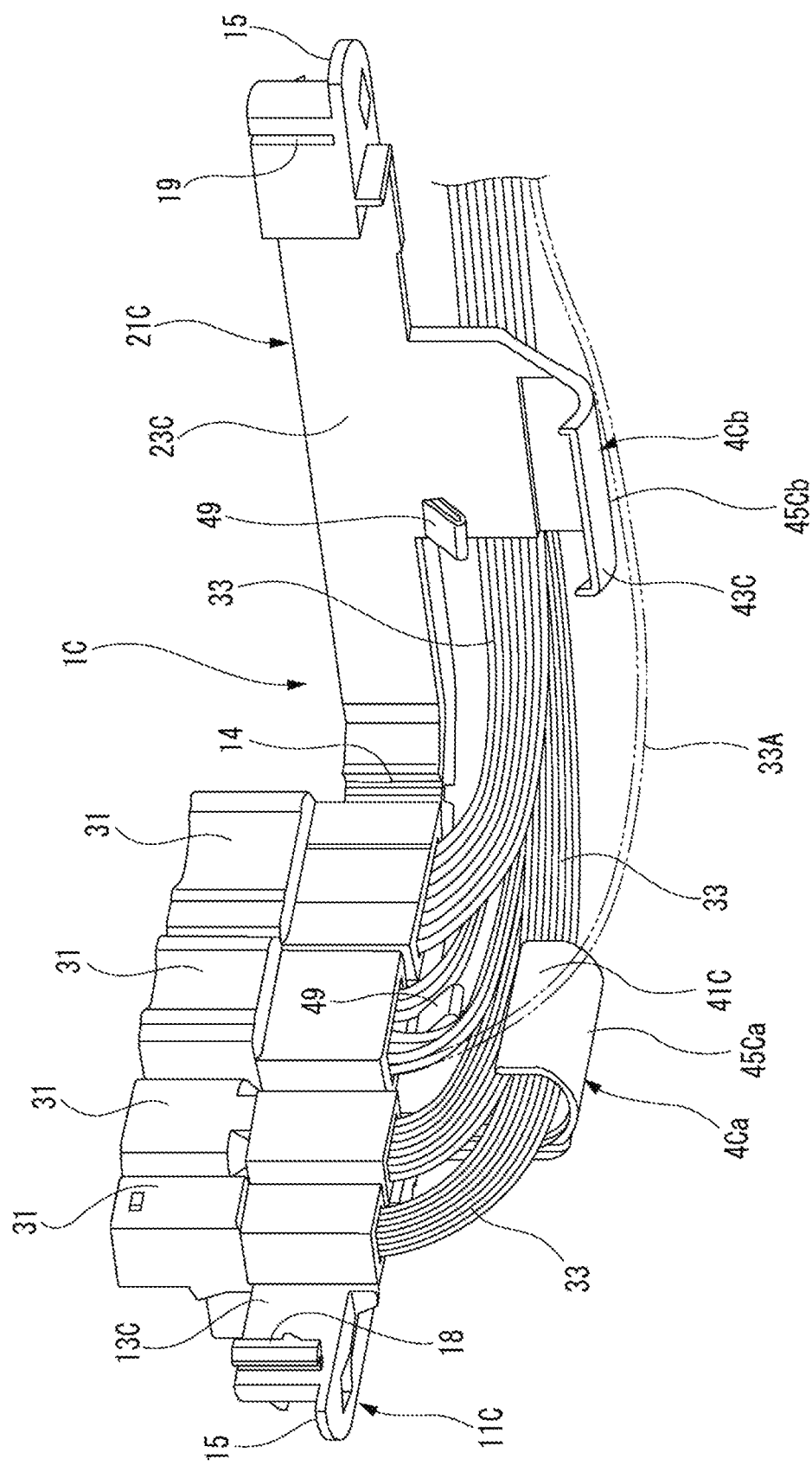
FIG. 13 is a perspective view showing an inner member of a grommet assembly according to a third embodiment of the present invention during assembly.
Figure 14:
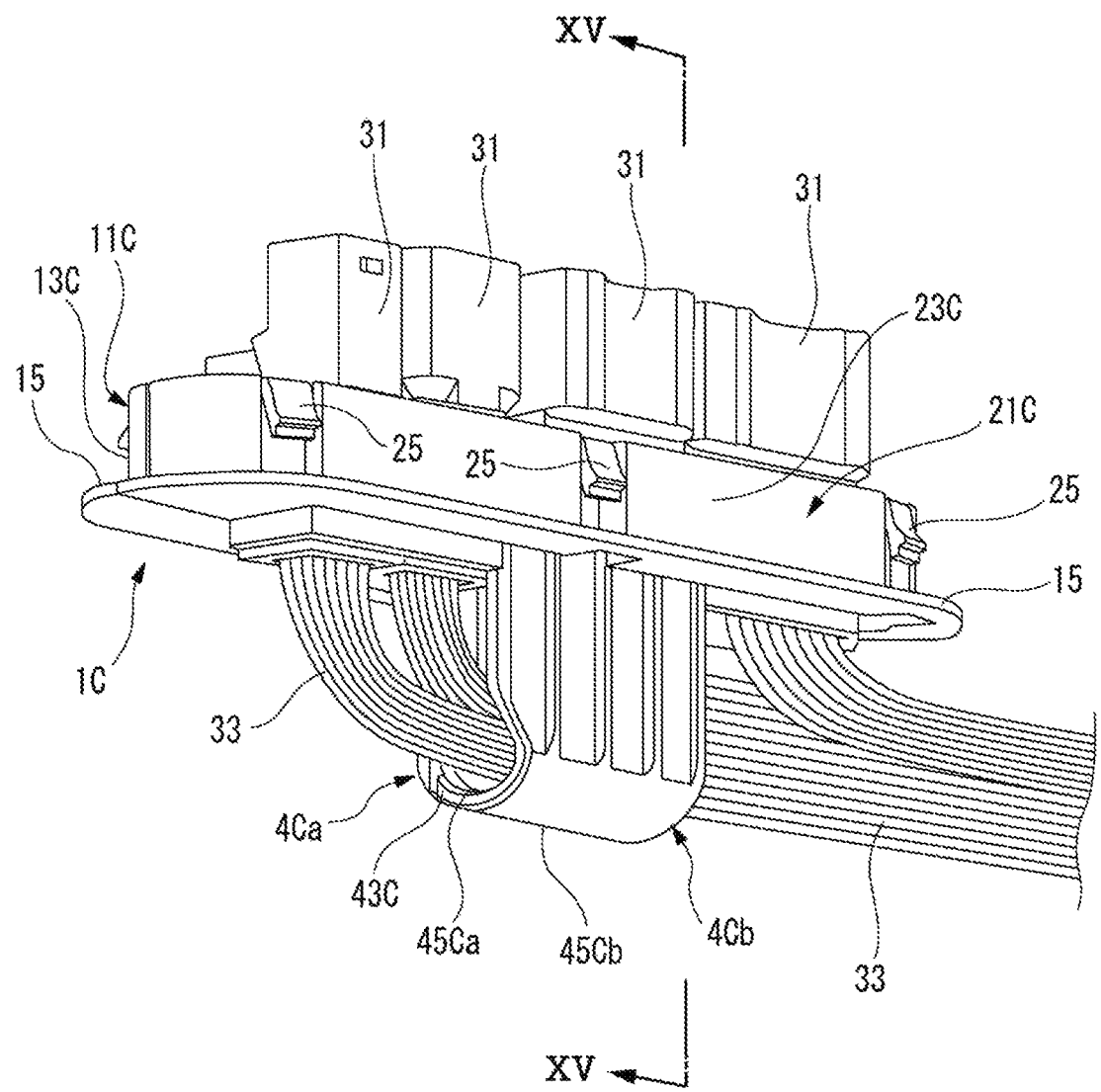
FIG. 14 is a perspective view showing a state in which the inner member shown in FIG. 13 is assembled.

FIG. 13 is a perspective view showing an inner member 1C of a grommet assembly 10C according to a third embodiment of the present invention during assembly. FIG. 14 is a perspective view showing a state in which the inner member 1C shown in FIG. 13 is assembled. FIG. 15 is a sectional view taken along a line XV-XV in FIG. 14. In the inner member 1C according to the third embodiment, the same configurations as those of the inner member 1A according to the first embodiment are denoted by the same reference numerals, and the descriptions thereof are omitted.

As shown in FIG. 13, the inner member 1C according to the third embodiment of the present invention is configured by a first half portion 11C and a second half portion 21C divided into two in a longitudinal direction along a fitting direction (center axis X direction of the mounting hole 105) into a flat tubular body having an oval opening.

A first protruding part 4Ca having a first pressing support portion 45Ca extending along the inner surface of the ceiling 54a of the wire housing portion 53 is provided on a rear side of a body portion 13C in the first half portion 11C. The first protruding part 4Ca is integrally formed with a body portion 13C, and is formed in a substantially J shape, which protrudes toward the ceiling 54a of the wire housing portion 53 of the mounted grommet 5, and has a first hook portion 41C bent back in a direction opposite to the protruding direction (downward in FIG. 13) of a distal end of the first pressing support portion 45Ca extending along the inner surface of the ceiling 54a.

A second protruding part 4Cb having a second pressing support portion 45Cb extending along an inner surface of the ceiling 54a of the wire housing portion 53 is provided on a rear side of a body portion 23C in the second half portion 21C. The second protruding part 4Cb is integrally formed with a body portion 23C and is formed in a substantially J shape, which protrudes toward the ceiling 54a of the wire housing portion 53 of the mounted grommet 5. The second protruding part 4Cb further includes a second hook portion 43C bent back at a protruding end of the second protruding part 4Cb in an opposite direction to which the second protruding part 4Cb protrudes (downward in FIG. 13) such that the second hook portion covers the first pressing support portion 45Ca, the second hook portion 43C including a second pressing support portion 45Cb that extends along an inner surface of the rear wall 54a of the wire housing portion. The first hook portion 41C to which the wire harness 33 is routed is formed longer than the second hook portion 43C.

As shown in FIG. 13, in a state where the other end portions of the first half portion 11C and second half portion 21C are separated from each other, the connectors 31 connected to the ends of the wire harnesses 33 passing through the grommet 5 are fixed to the fix portions 17 of the body portion 13C. At this time, the workability is favorable since the wire harnesses 33 drawn out from the connectors 31 are routed and organized in the first hook portion 41C of the first protruding part 4Ca.

Further, at least on an inner wall surface of the first protruding part 4Ca, an electric wire restricting portion 49 is provided to protrude and configured to restrict a part of electric wires 33A of the wire harnesses 33 routed in the first hook portion 41C from coming out of the first hook portion 41C as shown by an imaginary line in FIG. 13. The electric wire restricting portion 49 is a protruding piece that obliquely protrudes from the inner wall surface of the first protruding part 4Ca to the rear side of the inner member 1C. In the inner member 1C according to the third embodiment, the electric wire restricting portion 49 is also provided to protrude on an inner wall surface of the second protruding part 4Cb.

Next, as shown in FIG. 14, when the one end portions of the first half portion 11C and second half portion 21C are close to each other and the locking protrusion 18 is locked to the locking recess 19, the wire harnesses 33 are inserted into an oval opening 20 of the inner member 1C. When the locking protrusion 18 and the locking recess 19 are locked, in the first half portion 11C and the second half portion 21C, the body portion 13C and the body portion 23C are combined as opposed walls, so that the first pressing support portion 45Ca of the first protruding part 4Ca and the second pressing support portion 45Cb of the second protruding part 4Cb overlap.

As shown in FIG. 15, by overlapping the first pressing support portion 45Ca and the second pressing support portion 45Cb, a pressing force applied to the second pressing support portion 45Cb can be transmitted to the first pressing support portion 45Ca when the pressing force is applied on the second pressing support portion 45Cb of the second protruding part 4Cb. Then, the pressing force transmitted to the first pressing support portion 45Ca can be transmitted to the body portion 13C through the first protruding part 4Ca.

Similar to the inner member 1A according to the first embodiment, in the inner member 1C according to the third embodiment, the flange portions 15 of the inner member 1C are inserted into the flange fitting groove 52 of the panel contact portion 51, and the flange portions 15 are covered by the flange fitting groove 52 over the entire periphery. Therefore, the mounting of the grommet 5 to the inner member 1C is completed, and the assembling of the grommet assembly 10C is completed.

Therefore, according to the grommet assembly 10C of the third embodiment in which the grommet 5 is mounted on the inner member 1C, the first pressing support portion 45Ca of the first protruding part 4Ca provided to protrude on the rear side of the body portion 13C and the body portion 23C of the inner member 1C, and the second pressing support portion 45Cb of the second protruding part 4Cb are disposed along the inner surface of the ceiling 54a of the wire housing portion 53 in the grommet 5.

Therefore, when mounting the grommet assembly to the panel, the ceiling 54a of the wire housing portion 53 is pressed from above with a finger, so that the inner surface of the ceiling 54a in the elastically deformed wire housing portion 53 comes into contact with the second pressing support portion 45Cb of the second protruding part 4Cb, and the pressing force is transmitted to the first protruding part 4Ca through the first pressing support portion 45Ca. That is, the pressing force applied by the operator on the grommet assembly is reliably transmitted to the panel engagement portions 25 of the body portion 13C and body portion 23C through the first protruding part 4Ca and the second protruding part 4Cb.

Therefore, the panel engagement portions 25 can be reliably engaged with the opening edge 106 of the mounting hole 105 by pressing the ceiling 54a of the wire housing portion 53 with a finger. Therefore, similar to the grommet assembly 10A of the first embodiment, the grommet assembly 10C according to the third embodiment can be easily mounted to the panel 100 regardless of the panel shape of a mounting position.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. The inner members 1A, 1B, and 1C according to the respective embodiments include a plurality of fix portions 17 for fixing the connectors 31, and a plurality of separately configured connectors 31 are integrally combined to form a multipolar connector as a whole. The inner member of the present invention is not limited to such a configuration, and can be configured, for example, to be mounted onto a multipolar connector.

According to the exemplary embodiments described above, a grommet assembly (10A, 10B, 10C) includes an inner member (1A, 1B, 1C) that includes a first half portion (11A, 11B, 11C) and a second half portion (21A, 21B, 21C), each having a body portion (body portion 13A, 13B, 13C and body portion 23A, 23B, 23C) to be fitted into a mounting hole (105) of a panel (100) and a panel engagement portion (25) formed on the body portion and configured to be engaged with an opening edge (106) of the mounting hole, a grommet (5) configured to be mounted to a rear side of the inner member, the grommet including an annular panel contact portion (51) having a seal part (57) configured to contact a surface of a portion (107) of the panel (100) surrounding the mounting hole, and a tubular wire housing portion (53) connected to the panel contact portion and configured to cover an electric wire (e.g., the wire harness 33) such that the electric wire is bent with respect to a center axis (X) of the mounting hole and a first protruding part (4A, 4Ba, 4Ca) protruding in a first direction from a rear side of the first half portion toward a rear wall (54a) of the wire housing portion. The inner member is configured to be dividable into the first half portion and the second half portion along a direction in which the body portion of each of the first half portion and the second half portion is fitted into the mounting hole of the panel. The first protruding part includes a first hook portion (41A, 41B, 41C) bent back at a protruding end of the first protruding part toward a second direction opposite to the first direction, the first hook portion including a first pressing support portion (45A, 45Ba, 45Ca) including the protruding end of the first protruding part and extending along an inner surface of the rear wall of the wire housing portion.

The grommet assembly (10B, 10C) may further include a second protruding part (4Bb, 4Cb) protruding in the first direction from a rear side of the second half portion (21A, 21B, 21C) toward the rear wall (54a) of the wire housing portion (53). The second protruding part includes a second hook portion (43B, 43C) bent back at a protruding end of the second protruding part toward the second direction such that the second hook portion covers the first pressing support portion (45Ba, 45Ca), the second hook portion comprising a second pressing support portion (45Bb, 45Cb) including the protruding end of the second protruding part and extending along the inner surface of the rear wall of the wire housing portion.

The grommet assembly (10C) may further include an electric wire restricting portion (49) protruding on an inner wall surface of the first protruding part (4Ca), the electric wire restricting portion being configured to hinder the electric wire (wire harness 33) routed in the first hook portion (41C) from coming out of the first hook portion.

The grommet assembly (10C) may further include an electric wire restricting portion (49) protruding on an inner wall surface of the first protruding part (4Ca), the electric wire restricting portion being configured to hinder the electric wire (wire harness 33) routed in the first hook portion (41C) from coming out of the first hook portion.

What is claimed is:

1. A grommet assembly comprising:
    an inner member comprising a first half portion and a second half portion, each having a body portion to be fitted into a mounting hole of a panel and a panel engagement portion formed on the body portion and configured to be engaged with an opening edge of the mounting hole;
    a grommet configured to be mounted to a rear side of the inner member, the grommet comprising an annular panel contact portion having a seal part configured to contact a surface of a portion of the panel surrounding the mounting hole, and a tubular wire housing portion connected to the panel contact portion and configured to cover an electric wire such that the electric wire is bent with respect to a center axis of the mounting hole; and
    a first protruding part protruding in a first direction from a rear side of the first half portion toward a rear wall of the wire housing portion,
    wherein the inner member is configured to be dividable into the first half portion and the second half portion along a direction in which the body portion of each of the first half portion and the second half portion is fitted into the mounting hole of the panel, and
    wherein the first protruding part comprises a first hook portion bent back at a protruding end of the first protruding part toward a second direction opposite to the first direction, the first hook portion comprising a first pressing support portion including the protruding end of the first protruding part and extending along an inner surface of the rear wall of the wire housing portion.

2. The grommet assembly according to claim 1, further comprising
    a second protruding part protruding in the first direction from a rear side of the second half portion toward the rear wall of the wire housing portion,
    wherein the second protruding part comprises a second hook portion bent back at a protruding end of the second protruding part toward the second direction such that the second hook portion covers the first pressing support portion, the second hook portion comprising a second pressing support portion including the protruding end of the second protruding part and extending along the inner surface of the rear wall of the wire housing portion.

3. The grommet assembly according to claim 2, further comprising
    the electric wire restricting portion protruding on the inner wall surface of the first protruding part, the electric wire restricting portion being configured to hinder the electric wire routed in the first hook portion from coming out of the first hook portion.

4. The grommet assembly according to claim 1, further comprising
    an electric wire restricting portion protruding on an inner wall surface of the first protruding part, the electric wire restricting portion being configured to hinder the electric wire routed in the first hook portion from coming out of the first hook portion.

* * * * *